2,918,042
SOLENOID CONTROLLED FLUID ACTUATED HOLDING DEVICE

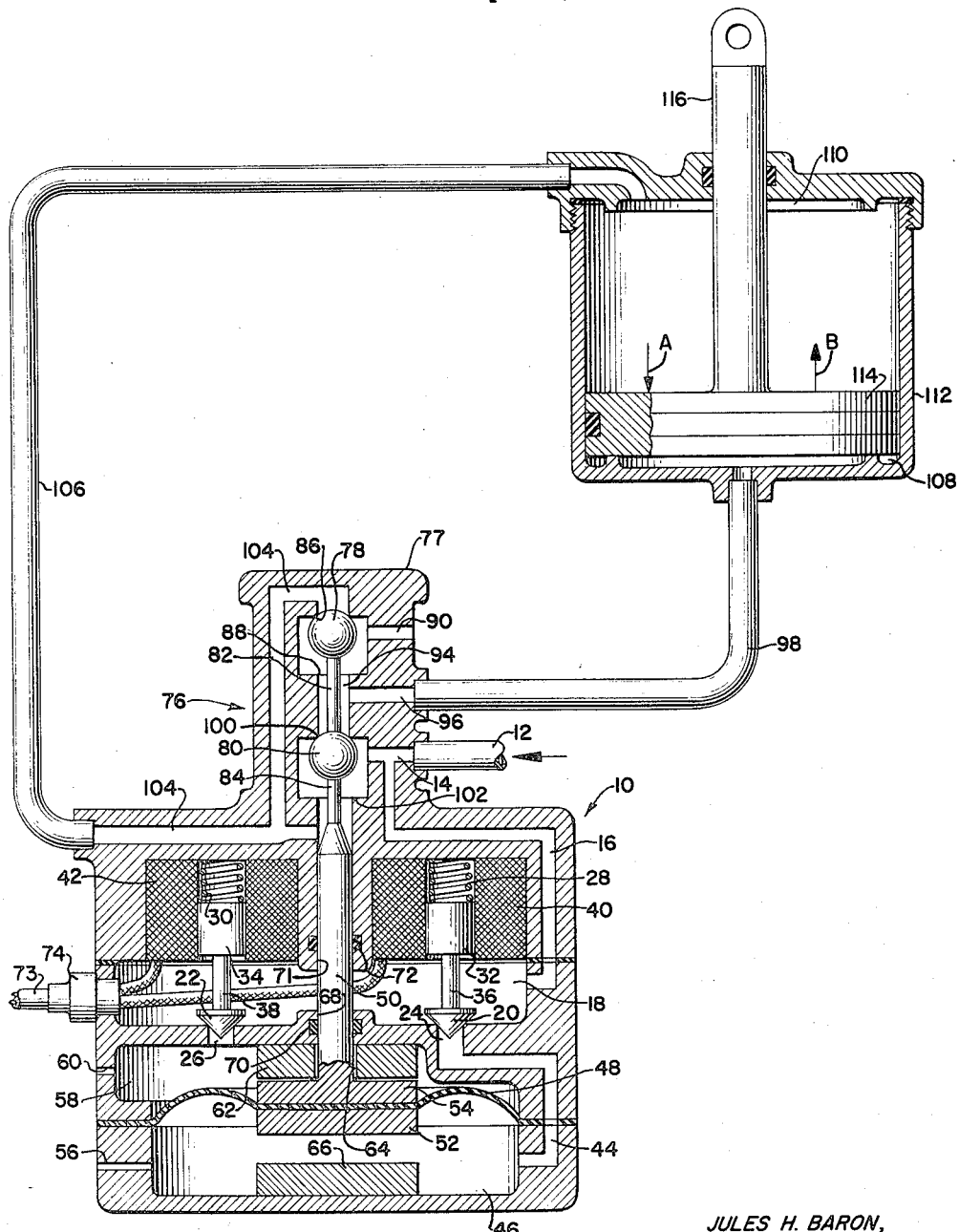

Raymond W. Jensen, Jules H. Baron, and William C. McNutt, Phoenix, Ariz., assignors to The Garrett Corporation, Los Angeles, Calif., a corporation of California Application September 17, 1957, Serial No. 684,534

8 Claims. (Cl. 121—46.5)

This invention relates to a solenoid controlled fluid actuated holding device, and more particularly to such a device in which a fluid operated actuator is electrically controlled, by solenoids, and actuates a movable member which is held by permanent magnet means in either of two predetermined positions.

Solenoid controlled holding devices are usually bulky and generally utilize an excessive amount of electrical energy, due to continuous electromagnetic duty of the controlling solenoids during continuous operation of such devices.

According to the present invention, a fluid actuated holding device is controlled by momentarily energized solenoids, and the actuator is held in either of two predetermined operating positions by a permanent magnet means while the solenoids are deenergized.

Accordingly, it is an object of the present invention to provide a compact solenoid controlled fluid actuated holding device which is particularly adapted for use in remotely controlling the operation of various devices or accessories in an aircraft.

Another object of the invention is to provide a solenoid controlled fluid actuated holding device wherein solenoids are only momentarily energized to establish a holding position of the device, thereby minimizing the amount of electrical energy required to maintain continued operation thereof.

A further object of the invention is to provide a fluid actuated holding device wherein momentarily energized solenoid valves are adapted to apply fluid pressure momentarily to a fluid pressure responsive means which furnishes actuating force to move a magnetically responsive means alternately into and out of either of two holding positions adjacent to spaced permanent magnets, whereby continuous functioning of said device is economical with respect to its usage of electrical and fluid energy.

Other objects and advantages of the invention may be apparent from the following specification, appended claims and accompanying drawings, in which:

The figure of the drawing is a diagrammatic sectional view of a solenoid controlled fluid actuated holding device constructed in accordance with the present invention.

As shown in the drawing, the device of the present invention is provided with a housing 10 having a fluid pressure inlet conduit 12 communicating therewith. This conduit 12 is connected to a fluid inlet port 14 having a branch passage 16 which communicates with a chamber 18 disposed to receive fluid under pressure and containing a pair of solenoid operated valves 20 and 22.

These valves are of the poppet type and are disposed to seat in and close ports 24 and 26 communicating with the chamber 18. The valves 20 and 22 are held normally closed by springs 28 and 30, which engage electromagnetically responsive armatures 32 and 34, respectively. These armatures 32 and 34 are connected to the valves 20 and 22 by stems 36 and 38, respectively. Fluid pressure in the chamber 18 also tends to hold the valves 20 and 22 closed relative to the ports 24 and 26; however, these valves are of small area and, therefore, the forces of fluid pressure acting thereon are nominal.

Surrounding the armatures 32 and 34 are solenoid windings 40 and 42, respectively, which when energized tend to retract the armatures 32 and 34 and open the valves 20 and 22.

The port 24 communicates with a passage 44, which extends to a chamber 46 in the housing 10. Movably positioned in this chamber 46 and forming one wall thereof is a diaphragm 48.

Connected to the diaphragm 48 is a shaft 50, having magnetically responsive plates 52 and 54 secured thereto and clamped on opposite sides of the diaphragm 48. Communicating with the chamber 46 is a vent opening 56 which extends through the side wall of the housing 10 to ambient atmosphere. The function of the vent opening 56 will be hereinafter described. Disposed on the opposite side of the diaphragm 48 from the chamber 46 is an opposing chamber 58. The diaphragm 48 is movable in this chamber 58 and forms one side wall thereof. The port 26 communicates with the chamber 58 and a vent opening 60 extends through a wall portion of the housing 10 from the chamber 58 to ambient atmosphere. The function of the vent opening 60 will be hereinafter described.

It will be understood that the valves 20 and 22 are disposed to admit fluid pressure to opposite sides, respectively, of the diaphragm 48. This diaphragm constitutes an actuator means having opposed surfaces responsive to oppositely acting fluid pressures, which may alternately be admitted into the chambers 46 and 58, as will be hereinafter described in detail.

Disposed in the chamber 58 is a washer-shaped, permanent magnet 62, having a central opening 64 therein, through which the shaft 50 extends. This permanent magnet 62 is adapted to hold the magnetically responsive plate 54, the diaphragm 48 and shaft 50 in the positions shown in the drawing. A permanent magnet 66 is located in the chamber 46 in spaced relation to the permanent magnet 62, and this magnet 66 is disposed to hold the magnetically responsive plate 52 and shaft 50 adjacent thereto when the diaphragm 48 is disposed in an opposite position to that shown in the drawing, as will be hereinafter described in detail.

The shaft 50 extends through a bore 68 in the top wall of the chamber 58, and a seal 70 surrounds the shaft 50 and prevents leakage of fluid from the chamber 18, through the bore 68, along the shaft 50. The housing 10 is provided with another bore 71 having a seal 72 therein which is disposed in surrounding relationship with the shaft 50. This seal 72 also prevents leakage of fluid pressure from the chamber 18 along the shaft 50.

An electrical cable 73 is connected with a plug socket 74, which extends through the side wall of the housing 10 into the chamber 18 in sealed relationship therewith, so that electrical energy may be supplied to the solenoid windings 40 and 42 without leakage of fluid from the chamber 18.

By way of example, a fluid control valve 76 is shown in operable relation with the shaft 50 of the present solenoid controlled fluid actuated holding device. The fluid control valve 76 is provided with a housing 77 containing a pair of spherical valve elements 78 and 80, which are interconnected by a reduced diameter stem 82, and a second reduced diameter stem portion 84 connects the spherical valve member 80 with the shaft 50. The valve element 78 is disposed to engage a valve seat 86, in the housing 77, when the fluid control valve is in one position, and is further disposed to engage a valve seat 88 of the housing 77 when the fluid control valve is in another position.

Communicating with both seats 86 and 88 is an exhaust port 90, which extends through the side wall of the control valve housing 77 and communicates with the surrounding or ambient atmosphere.

The stem 82 of the fluid control valve member extends through an enlarged bore 94. This bore 94 communicates with a port 96 with which a conduit 98 communicates, as will be hereinafter described in detail. The bore 94 also communicates with a valve seat 100, engageable with the spherical valve element 80 when in the position as shown in the drawing. The valve element 80, when in its opposite position, engages a valve seat 102. Both valve seats 100 and 102 communicate with the fluid inlet port 14. The valve seats 86 and 102 both communicate with a passage 104, to which a conduit 106 is connected.

When the spherical valve elements 78 and 80 are in either of two predetermined positions, the forces of fluid pressures acting on these elements are balanced axially of the shaft 50, so that such pneumatic forces do not act in opposition to those of either permanent magnet 62 or 66, whichever happens to be holding the shaft 50 and plates 52 and 54 in either of said two predetermined positions.

It will be understood that the valve seats 86, 88, 100 and 102 are all of substantially equal area, whereby opposed forces of fluid pressure acting on the valve elements 78 and 80 may be substantially equal, as will be hereinafter described.

It will be noted that when the spherical valve elements 78 and 80 are in the position shown in the drawing, fluid pressure entering the port 14 via the conduit 12 concurrently exerts force on the valve elements 78 and 80, tending to force them toward each other. This balanced pressure condition exists due to the disposition of the fluid passage 104. When these valve elements 78 and 80 are in the other of two predetermined positions, they engage the valve seats 88 and 102, respectively. In this position, fluid pressure entering the inlet port 14 via the conduit 12, tends to force the valve elements 78 and 80 away from each other. This condition exists due to the bore 94 which intercommunicates with adjacent ends of the valve elements 78 and 80. From the foregoing, it will be obvious that fluid control valve 76 is so constructed that fluid pressures acting on the spherical valve elements 78 and 80 create a balance of fluid forces axially of the shaft 50, and thereby prevent the fluid control valve 76 from opposing force of either of the permanent magnets 62 and 66 when holding the shaft 50 and valve elements 78 and 80 in either of two predetermined positions.

It will be noted that when the valve elements 78 and 80 are fully engaged with respective seats 86 and 100, slight clearance exists between the plate 54 and the magnet 62. Similarly, when the valve elements 78 and 80 engage respective seats 88 and 102, slight clearance exists between the plate 52 and magnet 66. Thus, efficient seating of the valve elements 78 and 80 is assured.

The plates 52 and 54 may contact the magnets 66 and 62, respectively, when the device of the present invention is employed to actuate and hold mechanism other than a valve or structure requiring very precise positioning unrelated to the positions of the permanent magnets.

The conduits 98 and 106 communicate with opposite ends 108 and 110, respectively, of a fluid receiving cylinder 112, wherein a fluid pressure responsive piston 114 is reciprocally mounted. The present cylinder 112 and piston 114 are shown by way of example only and may be considered the equivalent of a fluid pressure responsive diaphragm or other actuator. Secured to the piston 114 is an actuating rod 116 which may be connected to any device such as a valve or other accessory requiring actuation into and out of either of two predetermined positions.

Operation of the present invention is substantially as follows:

When the diaphragm 48 and shaft 50 are in the position shown in the drawing, the magnetically responsive plate 54 is held in close proximity to the permanent magnet 62, and the spherical valve elements 78 and 80 are maintained in seating engagement with the valve seats 86 and 100, respectively. As hereinbefore described, fluid pressures acting on the valve elements 78 and 80 are substantially balanced axially of the shaft 50. Fluid under pressure entering the port 14 via the conduit 12 is conducted into the passage 104 and end 110 of the cylinder 112, thereby exerting force in the direction of arrow A, and maintaining the piston 114 in the position shown.

When it is desired to move the piston 114 from the end 108 of the cylinder 112 and to the end 110 thereof, the solenoid winding 42 is electrically energized. This solenoid winding 42 is energized by operation of a remote electrical switch, not shown, in connection with the cable 73. The switch, for example, may be located in the pilot's compartment of an airplane.

When the solenoid winding 42 is energized, the armature 34, concentrically located therein, is forced against compression of the spring 30 and carries the valve 22 and stem 38 toward the solenoid winding 42. When the valve 22 is thus removed from its seat in the port 26, fluid under pressure passes from the chamber 18 into the chamber 58. Due to the fact that the flow capacity of the port 26 is greater than that of the vent opening 60, pressure in the chamber 58 is rapidly increased and exerted on the diaphragm 48, thereby overcoming force of the permanent magnet 62 and moving the magnetically responsive plate 54 away therefrom. As the plate 54 is thus moved away from the permanent magnet 62, the diaphragm 48 under force of fluid pressure carries the magnetically responsive plate 52 into the field of the permanent magnet 66 and into close proximity thereto, whereupon the plate 52 is held firmly adjacent the permanent magnet 66. This action causes the shaft 50 to slide through the bores 68 and 71 and to retract the valve elements 78 and 80 from seats 86 and 100, respectively, to positions wherein they engage the valve seats 88 and 102, respectively.

It will be understood that energization of the solenoid 42 is only momentary, and that after the plate 52 is attracted and held by the permanent magnet 66, the solenoid winding 42 may be de-energized, permitting the spring 30 to force the valve 22 onto its seat in the port 26, thereby stopping flow of fluid under pressure from the chamber 18 into the chamber 58. Pressure is then gradually dissipated from the chamber 58 through orifice 60, whereby a subsequent admission of fluid pressure into the chamber 46 will create a substantial pressure differential across the diaphragm 48, tending to move it toward the chamber 58. The orifice 56 functions in a similar manner with respect to fluid pressure in the chamber 46 after the valve 20 is closed.

When the spherical valve elements 78 and 80 are engaged with the seats 88 and 102, respectively, fluid under pressure conducted into the port 14 via the conduit 12 flows through the bore 94, port 96 and conduit 98 to the end 108 of the cylinder 112. Concurrently, fluid pressure in the end 110 of the cylinder 112 is relieved via the conduit 106, passage 104, seat 86 and the exhaust port 90, to ambient atmosphere. Thus, a substantial pressure differential is created across the piston 114, which forces it in the direction of arrow B toward the end 110 of the cylinder 112 to project the actuating rod 116 to a desired predetermined position.

It will be understood that the solenoid windings 40 and 42 may be small and lightly energized, since they only have to overcome the forces of the light springs 28 and 30 and open the small pneumatic valves 20 and 22 against force of fluid pressure in the chamber 18 momentarily. Likewise, the shifting of the diaphragm 48 requires a very small amount of fluid energy and a very short duration of fluid flow into either of the chambers 46 or 58, in order to change the position of the actuator shaft 50 together with valve 76 or any appropriate device connected therewith.

Due to the momentary operation of the solenoids and the pneumatic actuator features of the invention, the present holding device may be compact and also economical to operate, since continuous duty of the device is accomplished by means of the permanent magnets 62 and 66, which hold the actuator shaft 50 in either of two predetermined positions as desired.

It will be understood by those skilled in the art that the solenoid controlled fluid actuated holding device of the present invention may be utilized to actuate a variety of equipment, such as valves, switches, or other devices, into and out of either of two predetermined positions.

We claim:

1. In a solenoid controlled fluid actuated holding device the combination of: actuator means having first and second opposed surfaces responsive to oppositely acting fluid pressures; a first valve disposed to control the application of fluid pressure to said first surface; a second valve disposed to control the application of fluid pressure to said second surface; first and second solenoids for actuating said first and second valves; first and second permanent magnets disposed in spaced relation to each other, said magnets being mounted in predetermined positions relative to which said actuator is movable; and magnetically responsive means secured to said actuator means and movable alternately into and out of predetermined positions adjacent to said first and second permanent magnets in response to alternate energizations of said first and second solenoids and the resultant applications of fluid pressure to said first and second surfaces.

2. In a solenoid controlled fluid actuated holding device the combination of: actuator means having first and second opposed surfaces responsive to oppositely acting fluid pressures; a first valve disposed to control the application of fluid pressure to said first surface; a second valve disposed to control the application of fluid pressure to said second surface; first and second solenoids for actuating said first and second valves; first and second permanent magnets disposed in spaced relation to each other, said magnets being mounted in predetermined positions relative to which said actuator is movable; magnetically responsive means secured to said actuator means and movable alternately into and out of predetermined positions adjacent to said first and second permanent magnets in response to alternate energizations of said first and second solenoids and the resultant application of fluid pressure to said first and second surfaces; and a fluid control valve disposed for operation by said actuator means.

3. In a solenoid controlled fluid actuated holding device the combination of: actuator means having first and second opposed surfaces responsive to oppositely acting fluid pressures; a first valve disposed to control the application of fluid pressure to said first surface; a second valve disposed to control the application of fluid pressure to said second surface; first and second solenoids for actuating said first and second valves; first and second permanent magnets disposed in spaced relation to each other, said magnets being mounted in certain positions relative to which said actuator is movable; magnetically responsive means secured to said actuator means and movable alternately into and out of predetermined positions adjacent to said first and second permanent magnets in response to alternate energizations of said first and second solenoids and the resultant application of fluid pressure to said first and second surfaces; a fluid control valve disposed for operation by said actuator means; and a second pressure responsive actuator communicating with said fluid control valve.

4. In a solenoid controlled fluid actuated holding device the combination of: actuator means having first and second opposed surfaces responsive to oppositely acting fluid pressures; a normally closed solenoid operated valve communicating with each of said first and second surfaces; springs tending to hold said solenoid operated valves closed; means for conducting fluid under pressure to said valves, alternate energization of said solenoid operated valves causing the alternate admission of fluid pressure from said means to said first and second surfaces; a magnetically responsive member secured to said actuator; and spaced substantially stationarily disposed permanent magnets between which said member is mounted and alternately movable into and out of predetermined positions adjacent thereto.

5. In a solenoid controlled fluid actuated holding device the combination of: actuator means having first and second opposed surfaces responsive to oppositely acting fluid pressures; a normally closed solenoid operated valve communicating with each of said first and second surfaces; springs tending to hold said solenoid operated valves closed; means for conducting fluid under pressure to said valves, alternate energization of said solenoid operated valves causing the alternate admission of fluid pressure from said first means to said first and second surfaces; a magnetically responsive member secured to said actuator; spaced substantially stationarily disposed permanent magnets between which said member is mounted and alternately movable into and out of predetermined positions adjacent thereto; and a fluid control valve disposed for operation by said actuator means.

6. In a solenoid controlled fluid actuated holding device the combination of: actuator means having first and second opposed surfaces responsive to oppositely acting fluid pressures; a normally closed solenoid operated valve communicating with each of said first and second surfaces; springs tending to hold said solenoid operated valves closed; means for conducting fluid under pressure to said valves, alternate energization of said solenoid operated valves causing the alternate admission of fluid pressure from said first-mentioned means to said first and second surfaces; a magnetically responsive member secured to said actuator; spaced substantially stationarily disposed permanent magnets between which said member is mounted, said member being alternately movable into and out of predetermined positions adjacent to said permanent magnets; a fluid control valve disposed for operation by said actuator means; and a second pressure responsive actuator communicating with and governed by said fluid control valve.

7. In a fluid control device, the combination of: a casing forming a chamber with a plurality of fluid pressure inlets; actuator means having a movable wall supported in said casing and dividing said chamber into two parts each having an inlet communicating therewith; normally closed electroresponsive valve means for controlling fluid flow through said inlets to apply fluid pressure to said actuator; and cooperative permanent magnetic and magnetic-responsive means on said casing and said actuator means, said magnetic means being operative to retain said actuator in positions to which it has moved in response to fluid pressure alternately admitted through said inlets.

8. In a fluid control device, the combination of: casing means forming a valve section and an actuator section, said casing means having a fluid pressure inlet communicating with both sections, said valve section having a plurality of work ports and an outlet port, said actuator section forming a chamber with a plurality of inlet ports communicating with the first-mentioned inlet; actuator means having a movable wall supported in said casing and dividing said chamber into two ports each having an inlet port communicating therewith; valve means disposed in said valve section and operatively disposed relative to said actuator; normally closed electro-responsive valve means for controlling fluid flow through said inlet ports to alternately apply fluid pressure to said actuator and move said valve means between positions establishing communication between said fluid pressure inlet and one work port and between the other work port and said outlet; and cooperative magnetic and magnetic-responsive means on said casing and said actuator means, said magnetic means being operative to retain said actuator in positions to which it has moved in response to fluid pressure alternately admitted through said inlet ports.

References Cited in the file of this patent
UNITED STATES PATENTS 2,708,948   Segerstad _____ May 24, 1955